(12) United States Patent
Muthiah

(10) Patent No.: US 12,189,818 B2
(45) Date of Patent: Jan. 7, 2025

(54) DATA STORAGE DEVICE AND METHOD FOR TOKEN GENERATION AND PARAMETER ANONYMIZATION

(71) Applicant: Western Digital Technologies, Inc., San Jose, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 198 days.

(21) Appl. No.: 17/736,378

(22) Filed: May 4, 2022

(65) Prior Publication Data
US 2023/0359766 A1 Nov. 9, 2023

(51) Int. Cl.
*G06F 21/62* (2013.01)

(52) U.S. Cl.
CPC ................ *G06F 21/6254* (2013.01)

(58) Field of Classification Search
CPC ............ G06F 21/6254; G06F 21/6245; G06F 21/6227; G06F 21/6218; G06F 21/62
See application file for complete search history.

(56) References Cited

U.S. PATENT DOCUMENTS

| 9,722,973 | B1 * | 8/2017 | Kothari ............... H04L 63/0435 |
| 9,998,435 | B1 | 6/2018 | Kothari et al. |
| 10,818,383 | B2 | 10/2020 | Sharifi Sedeh et al. |
| 10,877,900 | B1 * | 12/2020 | Muthiah ............... G06F 9/4411 |
| 2004/0078238 | A1 | 4/2004 | Thomas et al. |
| 2016/0132697 | A1 * | 5/2016 | Simske ............... G06F 21/6254 726/26 |
| 2017/0279786 | A1 | 9/2017 | Peterson et al. |
| 2017/0328997 | A1 * | 11/2017 | Silverstein ................ G01S 7/41 |
| 2018/0322170 | A1 * | 11/2018 | Alberton ........... G06F 16/24568 |
| 2021/0182189 | A1 * | 6/2021 | Duan ................... G06F 12/1009 |
| 2021/0256159 | A1 * | 8/2021 | Ninglekhu ............. H04W 4/70 |
| 2021/0303727 | A1 | 9/2021 | Nakajima |
| 2022/0245270 | A1 * | 8/2022 | De Araujo ............. G16H 40/67 |
| 2023/0113507 | A1 * | 4/2023 | Matsugami ......... G06F 12/0868 711/154 |

FOREIGN PATENT DOCUMENTS

| AU | 2013295603 A1 * | 2/2015 | ......... G06Q 30/0201 |
| CA | 2960220 A1 * | 3/2016 | ............. G07C 5/006 |
| CA | 2960220 C * | 9/2020 | ............. G07C 5/006 |
| DE | 102016207469 A1 * | 11/2017 | |
| WO | WO-2014018900 A1 * | 1/2014 | ......... G06Q 30/0201 |

* cited by examiner

*Primary Examiner* — Catherine Thiaw
*Assistant Examiner* — Daniel Elahian
(74) *Attorney, Agent, or Firm* — Crowell & Moring LLP

(57) ABSTRACT

A data storage device and method for token generation and parameter anonymization are provided. In one embodiment, a data storage device is provided comprising a memory and a controller. The controller is configured to receive a plurality of tokens and data comprising a plurality of data portions, which each token identifies a different set of the data portions to anonymize; create a plurality of anonymized versions of the data per the plurality of tokens; and store each of the plurality of anonymized versions of the data in different physical addresses in the memory, wherein the different physical addresses map to a same logical address in a mapping structure. Other embodiments are possible, and each of the embodiments can be used alone or together in combination.

20 Claims, 8 Drawing Sheets

DATA STORAGE DEVICE AND METHOD FOR TOKEN GENERATION AND PARAMETER ANONYMIZATION

BACKGROUND

A host can send data to a data storage device for storage in its memory. In some situations, the host performs an anonymization process on the data before sending it to the data storage device for storage. Anonymization is a process in which personal information is irreversibly altered in data for securing the privacy of users. There are many types of anonymization that can be performed on data, such as stubbing the data with a fake identifier, masking some portion of the data, or swapping different parameters in records to generalize the data. In some environments, a host generates a different data set for each anonymization technique. For example, in a medical application, if the user's name is to be anonymized, a host generates a first data set. If a decision is made to anonymize contact details, the host generates a second data set. Subsequently, if the user's age/or specific medical condition is to be anonymized, the host generates a third data set. Each of these data sets are sent to the data storage device for storage.

DETAILED DESCRIPTION

Overview

Figure 1A:
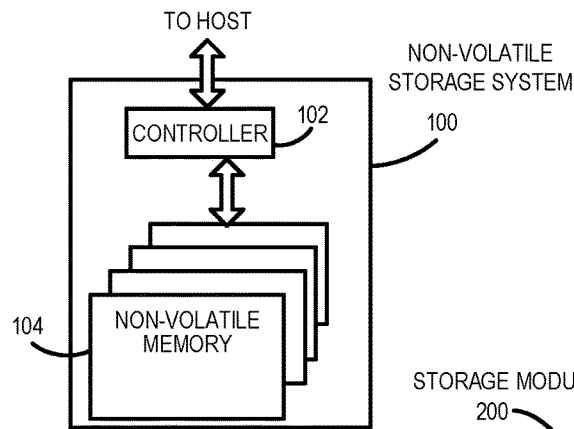
FIG. 1A is a block diagram of a data storage device of an embodiment.

By way of introduction, the below embodiments relate to a data storage device and method for token generation and parameter anonymization. In one embodiment, a data storage device is provided comprising a memory and a controller. The controller is configured to receive a plurality of tokens and data comprising a plurality of data portions, which each token identifies a different set of the data portions to anonymize; create a plurality of anonymized versions of the data per the plurality of tokens; and store each of the plurality of anonymized versions of the data in different physical addresses in the memory, wherein the different physical addresses map to a same logical address in a mapping structure.

In some embodiments, the controller is further configured to use a second mapping structure that maps tokens with data portions to determine which data portions to anonymize.

In some embodiments, the controller is further configured to parse the data into the plurality of data portions.

In some embodiments, the controller is further configured to: receive, from a host, one of the plurality of tokens and a request to read the logical address; read, from the memory, an anonymized version of the data stored in a physical address that corresponds to the logical address and the one of the plurality of tokens; and send the anonymized version of the data read from the memory to the host.

In some embodiments, the plurality of tokens comprise different storage biasing parameters; and each of the plurality of anonymized versions of the data is stored in the memory according to its associated storage biasing parameter.

In some embodiments, at least one storage biasing parameter identifies an endurance group.

In some embodiments, at least one storage biasing parameter identifies a quality of service storage location.

In some embodiments, at least one storage biasing parameter identifies a hot or cold storage location.

In some embodiments, the plurality of tokens and the data are received from a single host.

In some embodiments, the plurality of tokens and the data are received from a plurality of hosts.

In some embodiments, the data comprises vehicle data.

In some embodiments, the data comprises surveillance data.

In some embodiments, the data comprises medical data.

In some embodiments, the memory comprises a three-dimensional memory.

In another embodiment, a method is provided that is performed in a data storage device comprising a memory. The method comprises: receiving, from a host, an anonymization identifier and a request to read a logical address; reading data stored in a location in the memory associated with the logical address, wherein the data comprises a plurality of fields and the anonymization identifier identifies a set of fields to be anonymized; anonymizing the set of fields identified by the anonymization identifier; and sending, to the host, the data with the anonymized set of fields.

In some embodiments, the method further comprises using a map to identify the set of fields from the anonymization identifier.

In some embodiments, the data comprises vehicle data.

In some embodiments, the data comprises surveillance data.

In some embodiments, the data comprises medical data.

In another embodiment, a data storage device is provided comprising: a memory; means for creating a plurality of anonymized versions of data per a plurality of identifiers received from at least one host; and means for storing each of the plurality of anonymized versions of the data in different physical addresses in the memory, wherein the different physical addresses map to a same logical address in an address map.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
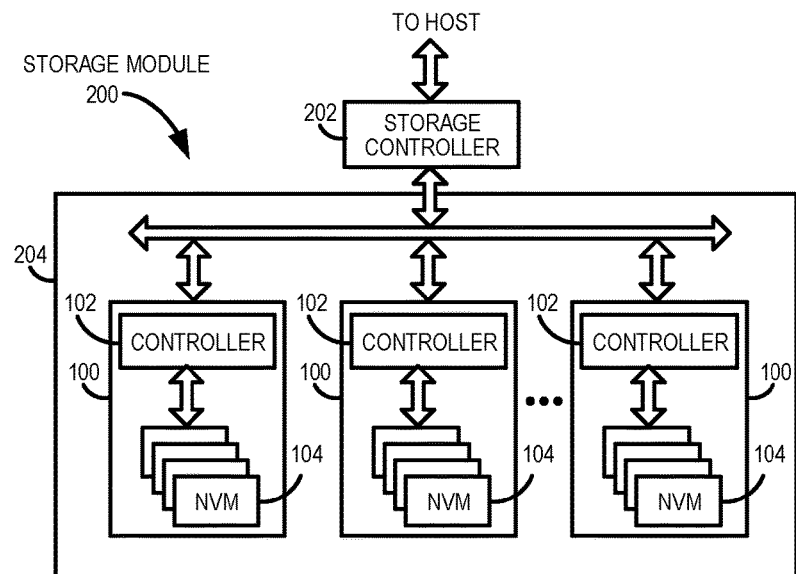
FIG. 1B is a block diagram illustrating a storage module of an embodiment.
Figure 1C:
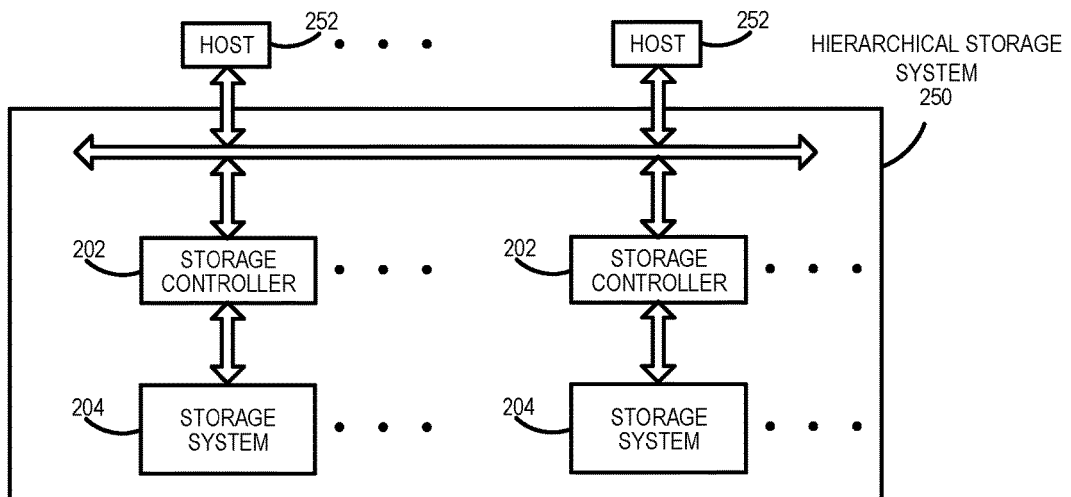
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cells (QLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
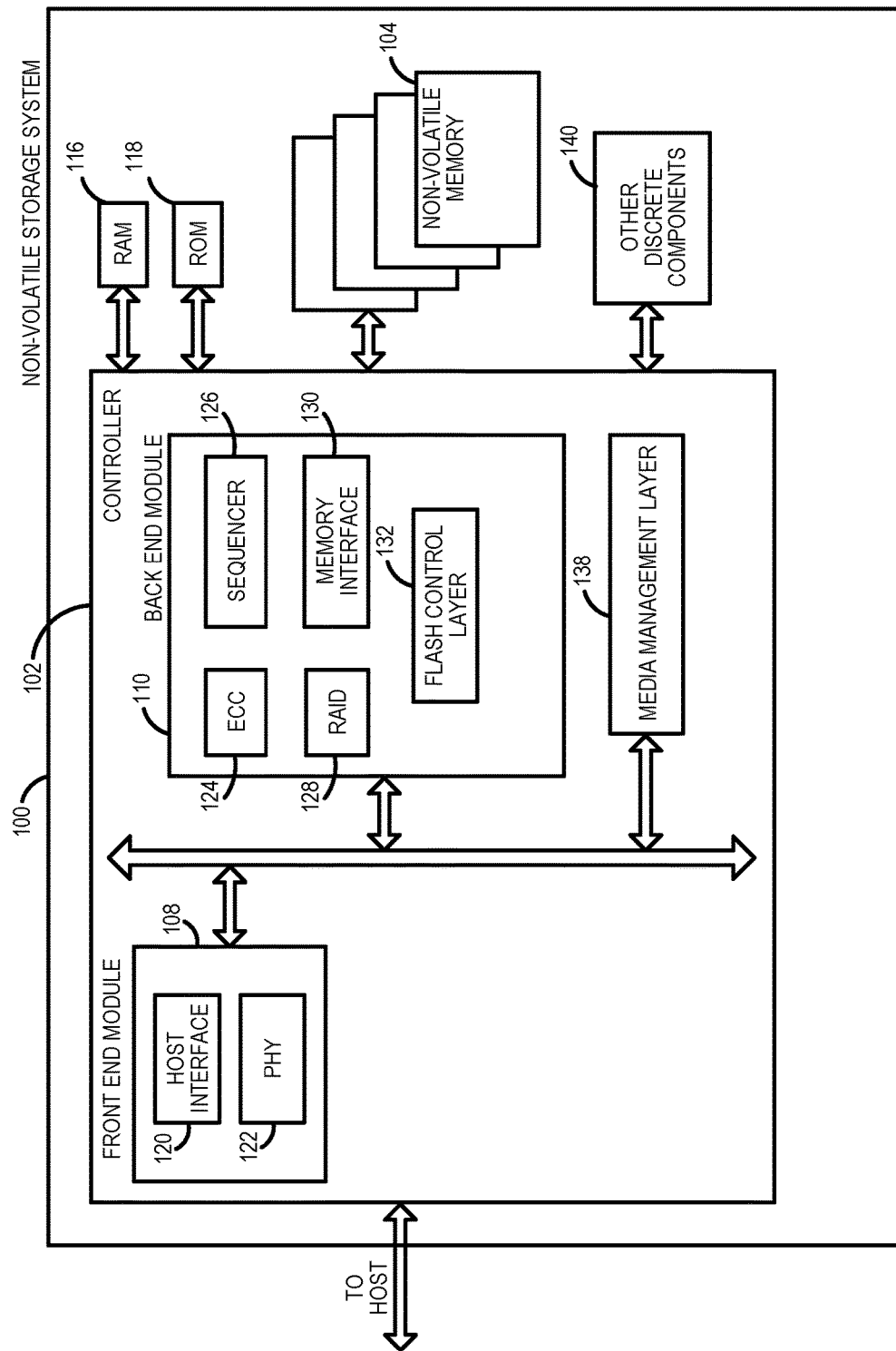
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a selfcontained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 144 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
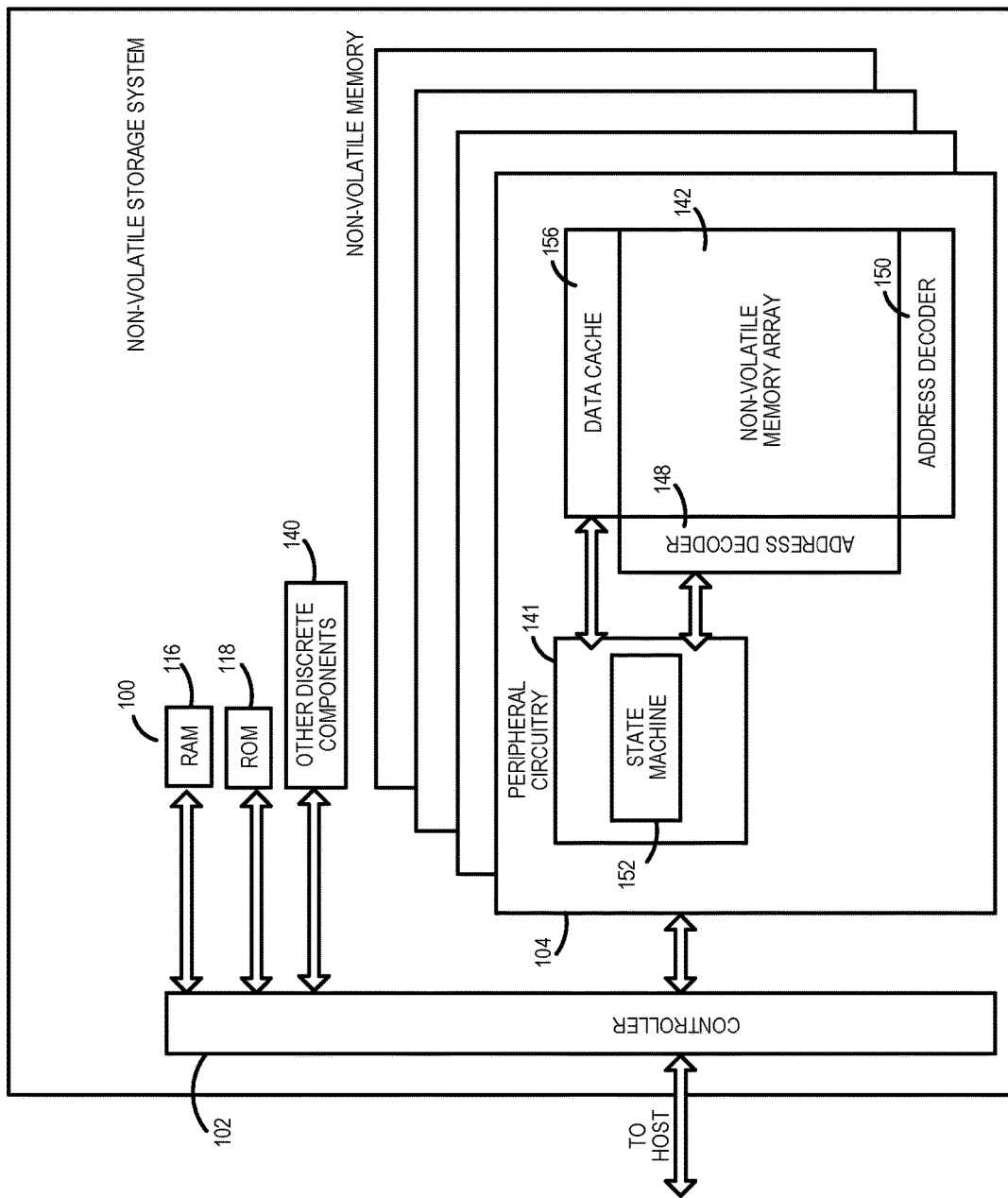
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
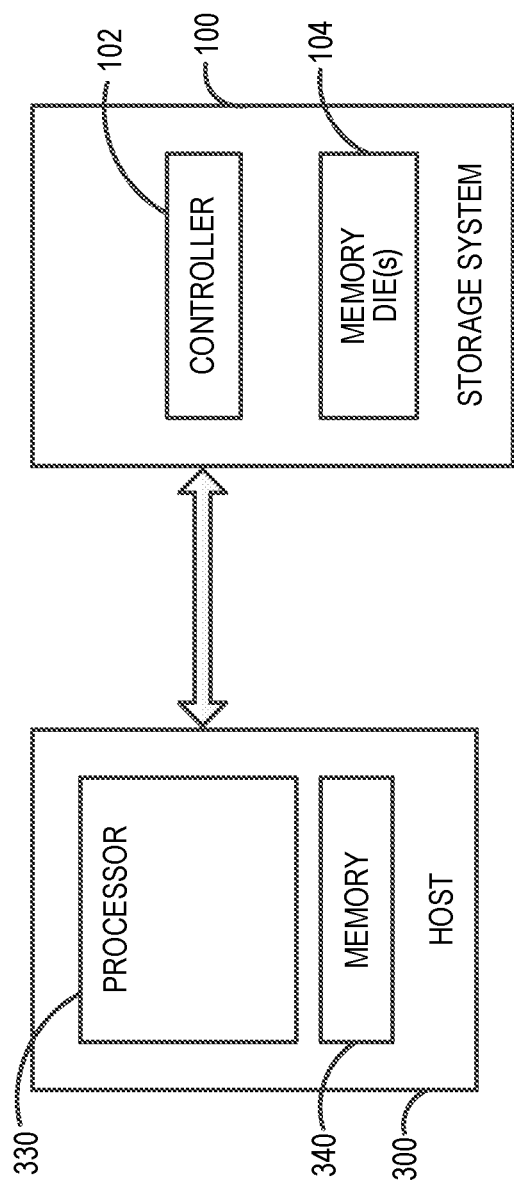
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a host can send data to a data storage device for storage in its memory. In some situations, the host performs an anonymization process on the data before sending it to the data storage device for storage. Anonymization is a process in which personal information is irreversibly altered in data for securing the privacy of users. There are many types of anonymization that can be performed on data, such as stubbing the data with a fake identifier, masking some portion of the data, or swapping different parameters in records to generalize the data. In some environments, a host generates a different data set for each anonymization technique. For example, in a medical application, if the user's name is to be anonymized, a host generates a first data set. If a decision is made to anonymize contact details, the host generates a second data set. Subsequently, if the user's age/or specific medical condition is to be anonymized, the host generates a third data set. Each of these data sets are sent to the data storage device for storage.

One problem with this approach is that multiple, large data sets are sent to the data storage device. Storing such a large amount of data, on top of performing read/write operations involved in a data storage device's normal workload, can reduce performance of the data storage device, as well as consume a lot of bus bandwidth between the host and data storage device. The following embodiments can be used to address this problem and allow dynamic in-house anonymization of different parameters. These embodiments can also provide storage write amplification reduction when used in a read path.

In one embodiment, the controller 102 of the data storage device 100 can cater to a mix of dynamic anonymization requirements. This can be achieved by associating tokens (identifiers, commands, indicators, etc.) to anonymize a set of (one or more) parameters (fields, data segments) in the data. The embodiments can also be used in various environments, such as NVMe, to allow multiple hosts to use different anonymized data in accordance with a predetermined policy. The following paragraph provide examples of various implementations of these embodiments. It should be noted that these are merely examples, and the details presented herein should not be read into the claims unless expressly recited therein.

In one embodiment, the host 300 generates an anonymization parameter table by grouping one or more parameters in the data and mapping against a token identifier for anonymization. The host 300 can provide the token to the data storage device 100 alongside the logical data. The host 300 can generate one or more tokens according to the different anonymization requirements. The tokens in the mapping table or other data structure can further reflect the depth of anonymization required for various algorithms. The controller 102 in the data storage device 100 can classify/segregate various parameters in a stream of data, anonymizing those parameters and generating multiple versions of the data according to the tokens provided with the data. The processor 102 can then store different anonymized levels of data in the memory 104 and track the different anonymized data via multiple versions of logical-to-physical (L2P) address entries for logical addresses according to the anonymization token.

The controller 102 in the data storage device 100 can have multiple types of anonymized data according to the tokens. In some cases, the host 300 biases the tokens. Based on the biasing, the processor 102 can store the anonymized data associated with the tokens with storage biasing. Examples of such biasing include, but are not limited to, storing the data in high/low endurance groups of storage locations (e.g., in an NVMe environment), storing the data in low/high quality of service (QoS) storage locations, storing the data in hot/cold storage locations, and any other suitable biasing techniques now known or later developed.

In an example involving autonomous vehicles, token 1 may be associated with anonymizing vehicle ownership; token 2 may be associated with global positioning system (GPS) information along with vehicle ownership, token 3 may be associated with camera captures alone, token 4 may be associated with anonymized GPS and camera captures together, and so on. The anonymization algorithms can involve any suitable techniques now known (such as masking) or later developed. The anonymization may either happen in the write path when the data is written in the memory 104 or in the read path when the data is read from the memory 104 in response to a read command from the host 300.

During data retrieval, the controller 102 can map the token to the set of anonymization parameters, apply the token index to the logical-to-physical address entry, and release the data with anonymized parameters associated for that token. Likewise, the controller 102 can satisfy a client/token-based anonymization requirement to stub or anonymize one or more specific parameters in the data stream. In another embodiment, owing to minimizing storage requirements, the tokens for logical data can be maintained in the data storage device 100 alongside actual data without anonymization, and the parameter anonymization can be triggered only after the retrieval request based on the tokens associated with commands. This can affect the quality of service of data retrieval and, hence, can be a trade-off with write amplification in the memory 104.

Figure 4:
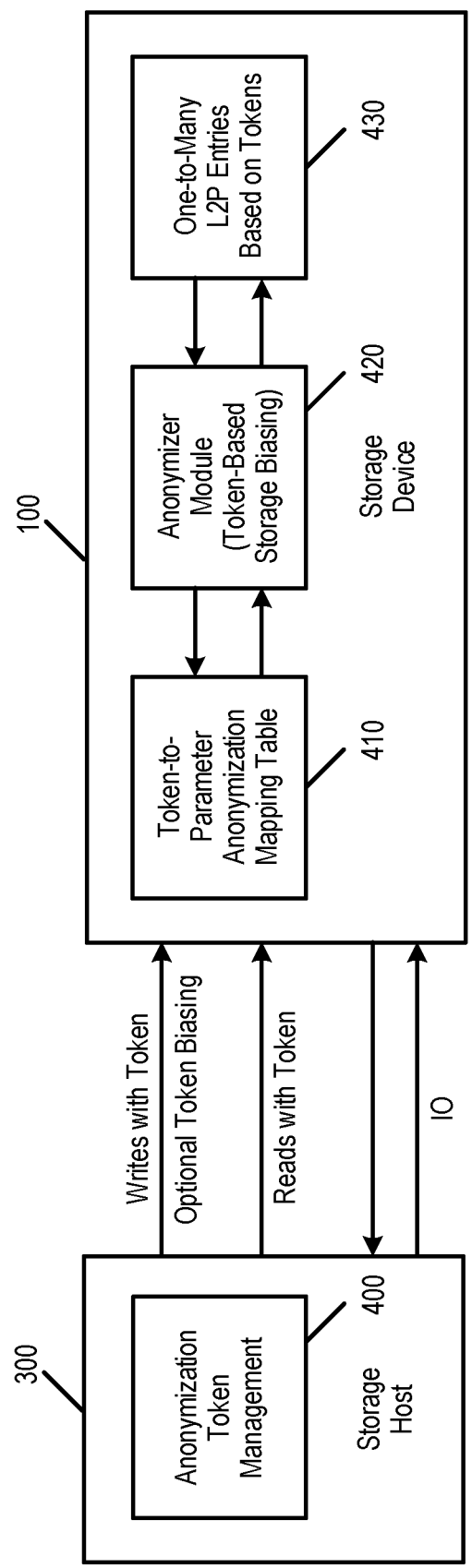
FIG. 4 is a block diagram of a host and data storage device of an embodiment.

Turning again to the drawings, FIG. 4 is a diagram that illustrates this embodiment. As shown in FIG. 4, the host 300 comprises an anonymization token management module 400, which can be implemented by the processor 330 (e.g., by executing computer-readable program code stored in the memory 340 of the host 300). The data storage device 100 comprises a token-to-parameter anonymization mapping table 410, an anonymizer module 420 for token-based storage biasing, and one-to-many logical-to-physical address entries 430 based on tokens.

As illustrated in FIG. 4, the host 300 sends, to the data storage device 100, write commands with tokens (and, optionally, with token biasing). In operation, whenever a parameter is to be anonymized, the anonymization token management module 400 in the host 300 groups, generates, and provides the appropriate tokens. The anonymizer module 420 in the data storage device 100 maps a token received from the host 300 to a parameter, performs data parsing, applies predetermined anonymization, and stores multiple entries using one-to-many logical-to-physical address entries 430. For example, logical data range X can be associated with tokens 0 and 2. Two logical-to-physical address entries (for write path anonymization) can be used, where physical address 0 is associated with token 0 (one set of parameters is anonymized), and physical address 1 is associated with token 2 (another set of parameters is anonymized). Another embodiment uses the token in the mapping table and anonymizes data during a retrieval request rather than during a write request. In another embodiment, different bias storage options for different anonymized data are used according to token biasing.

Figure 5:
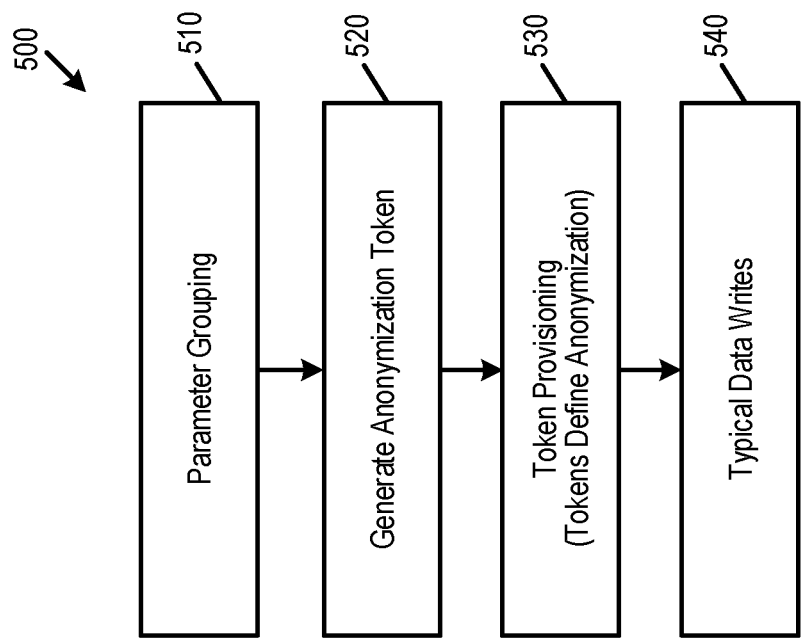
FIG. 5 is a flow chart of a method of a token-based anonymization process performed by a host of an embodiment.
Figure 6:
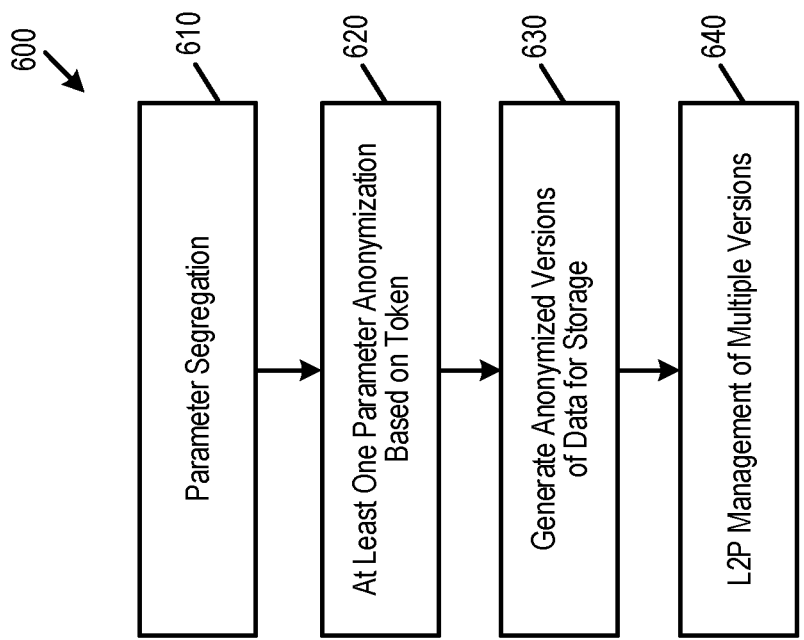
FIG. 6 is a flow chart of a method of a token-based anonymization process performed by a data storage device of an embodiment.
Figure 7:
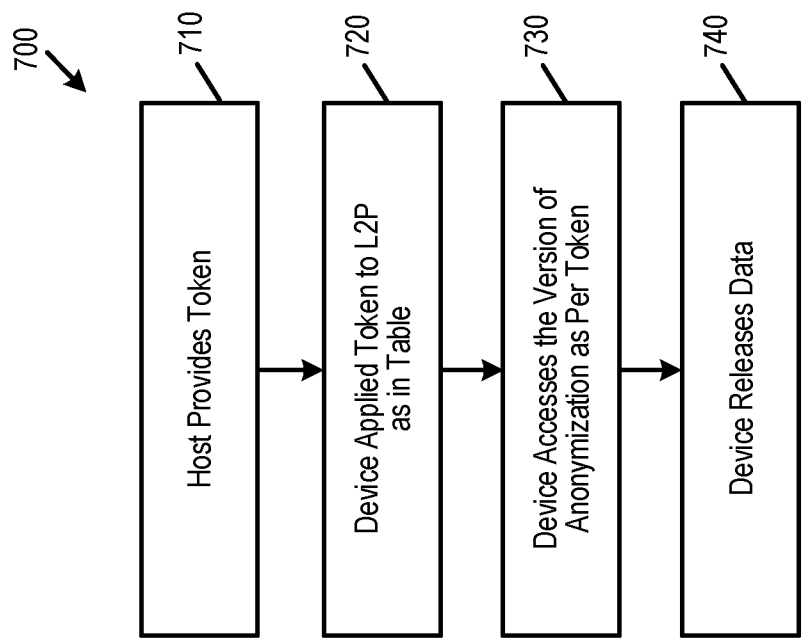
FIG. 7 is a flow chart of a method of an embodiment for accessing token-based anonymization data.

FIGS. 5-7 illustrate the above-described processes. FIG. 5 is a flow chart 500 of a method of a token-based anonymization process performed by the processor 330 of the host 300. As shown in FIG. 5, the processor 330 first performs parameter grouping (act 510). Then, the processor 330 generates the anonymization token (act 520) and provisions the token, where the tokens define the anonymization (act 530). Finally, the host 300 performs typical data writes (act 540). FIG. 6 is a flow chart 600 of a method of a token-based anonymization process performed by the controller 102 of the data storage device 100. As shown in FIG. 6, the controller 102 first performs parameter segregation (act 610). Next, the controller 102 performs at least one parameter anonymization based on a token (act 620). Then, the controller 102 generates an anonymized version of the data for storage (act 630). Finally, the controller 102 performs logical-to-physical address table management of the multiple version (act 640). FIG. 7 is a flow chart 700 of a method of an embodiment for accessing token-based anonymization data. As shown in FIG. 7, the host 300 provides a token (act 710), and the data storage device 100 applies the token, as in the table (act 720). Next, the data storage device 100 accesses the version of anonymization as per the token (act 730) and releases the data (act 740).

There are many alternatives that can be used with these embodiments. For example, while a single host was described in the above-examples, these embodiments can be used in a multi-host environment, such as NVMe, to enable multiple hosts to access base data with different anonymized levels. For example, host 1 may provide token 1 and retrieve the anonymized data, where parameters in the data are anonymized according to token 1. Internally, the data storage device 100 can route the data to physical storage 1 for the same logical data as base data. Host 2 can provide token 2 and retrieve a different set of parameters anonymized in data according to token 2, and the data storage device 100 can have routed the data to physical storage 2 for the same logical data as base data. Host 3 can provide token 0 to retrieve non-anonymized data (base data). That is, based on the token (or the accessing client or application), the data storage device 100 can perform different types of anonymization of parameters in the data.

As another alternative, an anonymization copy can be used. In some of the above embodiments, there is no anonymization copy, as there is only a base copy and the end-to-end protection. In cases where the controller 102 determines that the request is for an anonymization copy (from multiple logical-to-physical address entries), the controller 102 can have an option to forego end-to-end protection for that request. In another embodiment, the controller 102 can use the original data (original or first logical-to-physical address entry) to perform an end-to-end check (which will pass) but provide the anonymized data (based on another logical-to-physical address entry). To achieve this, the controller 102 can maintain a table for logical data that has been anonymized and use those entries to verify protection. Likewise, the controller 102 can manage the end-to-end protection checks, which can include encoding the host logical block address (LBA) together with user data and verifying that the LBA matches the request in order to avoid potential mis-compares due to flash translation layer (FTL) corruption. Multiple pointers to the same physical page from different LBAs can break this protection, so the above alternative can be used to verify the original host LBA when there are multiple copies.

Also, it should be understood that any suitable data can be used. Medical data was given as an example above, as was vehicle data. Regarding vehicle data, a car manufacturer may desire strong security to ensure that forensic data from a crash is not tampered with. Anonymization on read with preservation of the original recording for forensics may be useful here. When such critical data is to be read, the host 300 may prefer to read anonymized data (with that token ID) with preservation of the original recording or base data. While doing so, the controller 102 can also add metadata, such as timestamps or watermarks) to the data (e.g., in a sideband channel that does not interfere with the original recording) based on token IDs. For example, token 0 can be base data, token 1 can be anonymized data, and token 2 can be anonymized data with watermark metadata. Adding such metadata to the data enables validation of the original data when anonymized.

As another example, the data can be video and/or audio data from a surveillance system that generates a surveillance stream from a plurality of programs. The data storage device 100 can anonymize a particular program with a given program identifier (ID) during a write or during a read based on a token. The data storage device 100 can also anonymize multiple programs for another token. In this way, tokens enable depth of anonymization.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory; and
    a processor configured to:
        receive, from a host, a logical address and data comprising a plurality of data portions in a non-anonymized form, wherein the host transmits a non-anonymized version of the data to the data storage device for storage;
        receive, from the host, a plurality of tokens, wherein each token of the plurality of tokens identifies a different set of the data portions to anonymize;
        create a plurality of anonymized versions of the data per the plurality of tokens;
        store the plurality of anonymized versions of the data in a respective plurality of different physical addresses in the memory;
        create a one-to-many logical-to-physical address entry that maps the logical address to the plurality of different physical addresses, wherein each different physical address is indexed by a respective one of the plurality of tokens;
        receive a request to read the logical address, wherein the request comprises one of the plurality of tokens;
        use the one-to-many logical-to-physical address entry and the one of the plurality of tokens to determine which of the different physical addresses to read;
        read the anonymized version of the data stored in the determined physical address; and
        send the read anonymized version of the data in response to the request.

2. The data storage device of claim 1, wherein the processor is further configured to:
    use a mapping structure that maps tokens with data portions to determine which data portions to anonymize.

3. The data storage device of claim 1, wherein the processor is further configured to parse the data into the plurality of data portions.

4. The data storage device of claim 1, wherein:
    the plurality of tokens comprises different storage biasing parameters; and
    each of the plurality of anonymized versions of the data is stored in the memory according to its associated storage biasing parameter.

5. The data storage device of claim 4, wherein at least one storage biasing parameter identifies an endurance group.

6. The data storage device of claim 4, wherein at least one storage biasing parameter identifies a quality of service storage location.

7. The data storage device of claim 4, wherein at least one storage biasing parameter identifies a hot storage location.

8. The data storage device of claim 4, wherein at least one storage biasing parameter identifies a cold storage location.

9. The data storage device of claim 1, wherein the plurality of tokens and the data are received from a single host.

10. The data storage device of claim 1, wherein the plurality of tokens and the data are received from a plurality of hosts.

11. The data storage device of claim 1, wherein the data comprises vehicle data.

12. The data storage device of claim 1, wherein the data comprises surveillance data.

13. The data storage device of claim 1, wherein the data comprises medical data.

14. The data storage device of claim 1, wherein the memory comprises a three-dimensional memory.

15. A method comprising:
performing the following in a data storage device comprising a memory:
receiving, from a host, a logical address and data comprising a plurality of data portions in a non-anonymized form, wherein the host transmits a non-anonymized version of the data to the data storage device for storage;
receiving, from the host, a plurality of anonymization identifiers, wherein each anonymization identifier of the plurality of anonymization identifiers identifies a different set of the data portions to anonymize;
creating a plurality of anonymized versions of the data per the plurality of anonymization identifiers;
storing the plurality of anonymized versions of the data in a respective plurality of different physical addresses in the memory;
creating a one-to-many logical-to-physical address entry that maps the logical address to the plurality of different physical addresses, wherein each different physical address is indexed by a respective one of the plurality of anonymization identifiers;
receiving a request to read the logical address, wherein the request comprises one of the plurality of anonymization identifiers;
using the one of the plurality of anonymization identifiers to determine which of the different physical addresses to read;
reading the anonymized version of the data stored in the determined physical address;
using the one-to-many logical-to-physical address entry and the one of the plurality of anonymization identifiers to determine which of the different physical addresses to read;
reading the anonymized version of the data stored in the determined physical address; and
sending the read anonymized version of the data in response to the request.

16. The method of claim 15, further comprising:
using a map to identify the set of fields from the anonymization identifier.

17. The method of claim 15, wherein the data comprises vehicle data.

18. The method of claim 15, wherein the data comprises surveillance data.

19. The method of claim 15, wherein the data comprises medical data.

20. A data storage device comprising:
a memory; and
means for:
receiving, from a host, a logical address and data comprising a plurality of data portions in a non-anonymized form, wherein the host transmits a non-anonymized version of the data to the data storage device for storage;
receiving, from the host, a plurality of tokens, wherein each token of the plurality of tokens identifies a different set of the data portions to anonymize;
creating a plurality of anonymized versions of the data per the plurality of tokens;
storing the plurality of anonymized versions of the data in a respective plurality of different physical addresses in the memory;
creating a one-to-many logical-to-physical address entry that maps the logical address to the plurality of different physical addresses, wherein each different physical address is indexed by a respective one of the plurality of tokens;
receiving a request to read the logical address, wherein the request comprises one of the plurality of tokens;
using the one-to-many logical-to-physical address entry and the one of the plurality of tokens to determine which of the different physical addresses to read;
reading the anonymized version of the data stored in the determined physical address; and
sending the read anonymized version of the data in response to the request.

* * * * *